J. W. UPP.
APPARATUS FOR ASSEMBLING DEVICES COMPRISING A NUMBER OF PARTS.
APPLICATION FILED MAY 1, 1919.
1,408,047.
Patented Feb. 28, 1922.
2 SHEETS—SHEET 2.
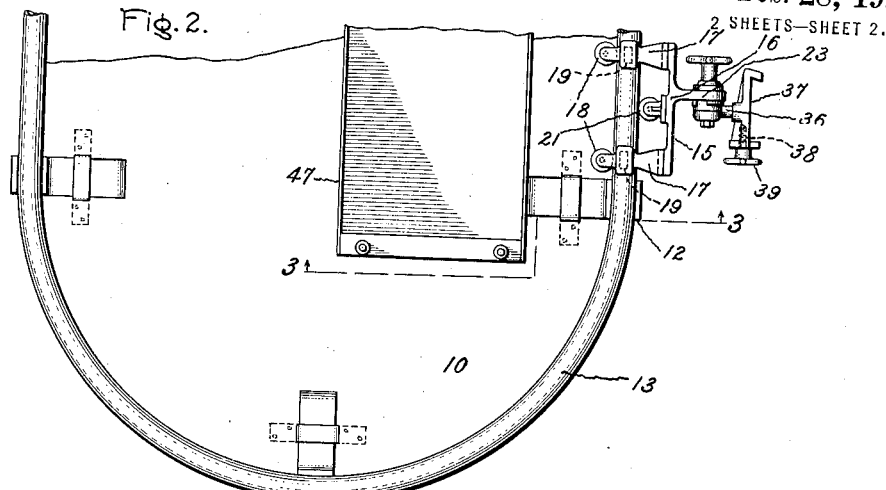
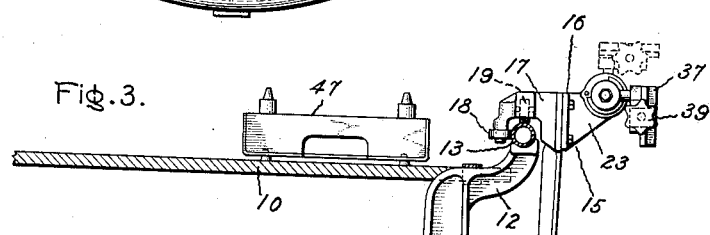
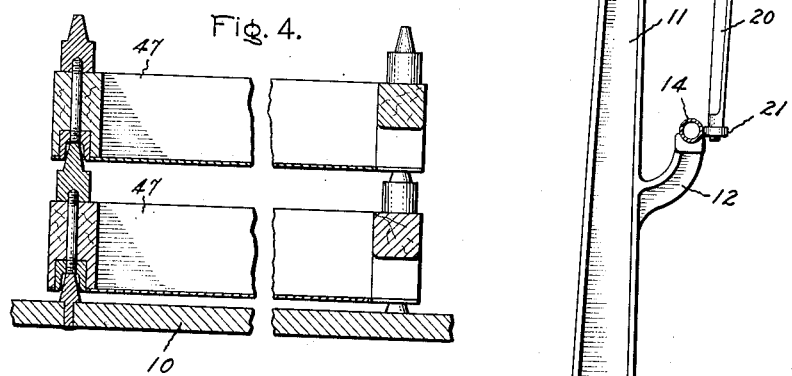
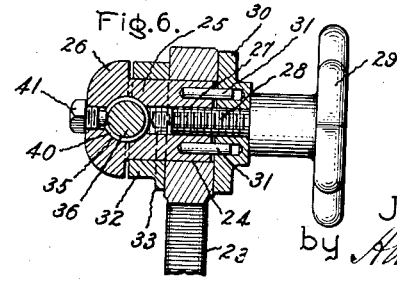
Inventor:
John W. Upp,
by Albert G. Davis
His Attorney

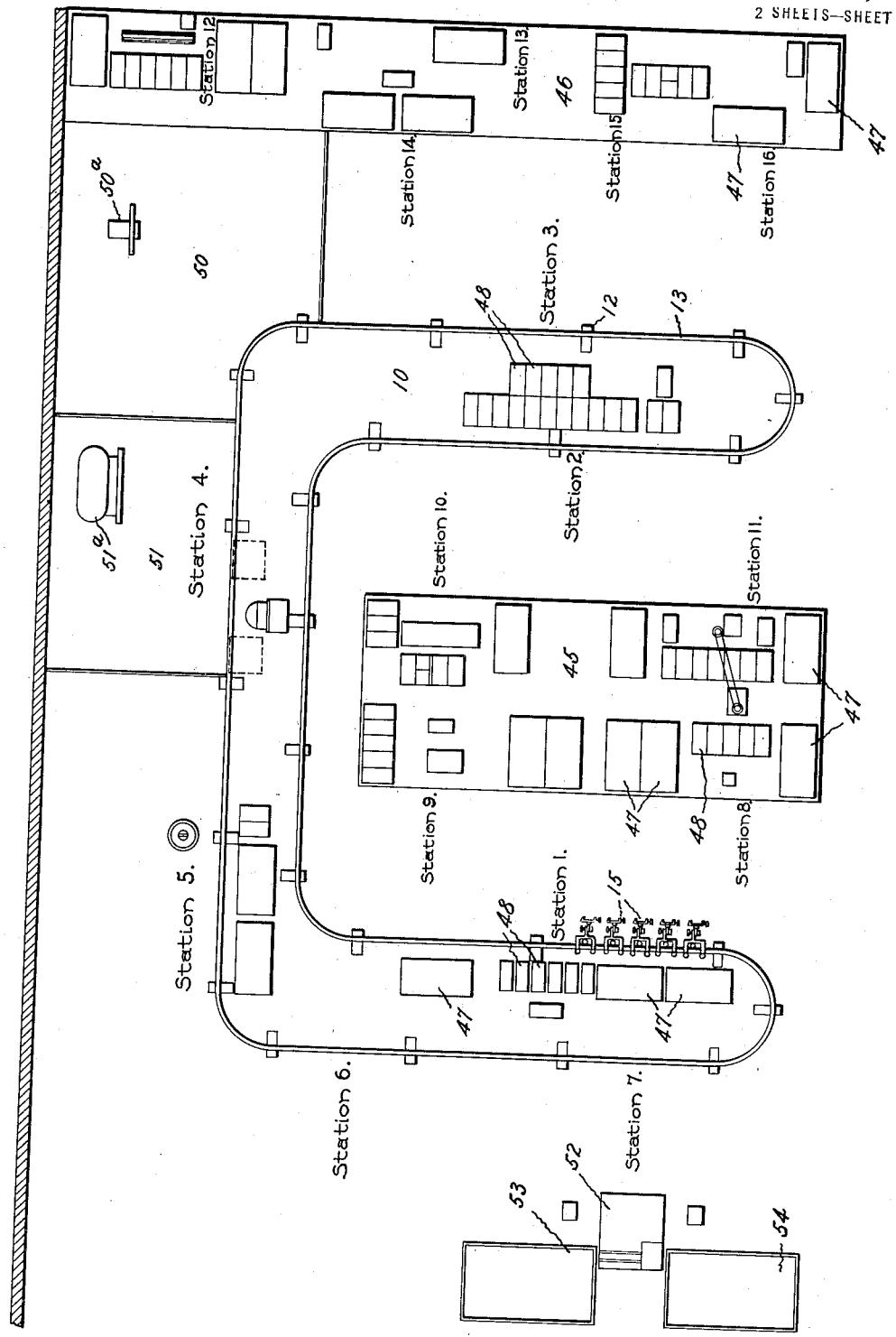

UNITED STATES PATENT OFFICE.

JOHN W. UPP, OF SCHENECTADY, NEW YORK, ASSIGNOR TO GENERAL ELECTRIC COMPANY, A CORPORATION OF NEW YORK.

APPARATUS FOR ASSEMBLING DEVICES COMPRISING A NUMBER OF PARTS.

1,408,047.

Specification of Letters Patent. Patented Feb. 28, 1922.

Application filed May 1, 1919. Serial No. 294,109.

*To all whom it may concern:*

Be it known that I, JOHN W. UPP, a citizen of the United States, residing at Schenectady, in the county of Schenectady, State of New York, have invented the following new and useful Improvements in Apparatus for Assembling Devices Comprising a Number of Parts, of which the following is a specification.

The present invention relates to the manufacture of devices comprising a number of parts which are assembled in certain relations to each other, and particularly to comparatively small devices comprising a comparatively large number of parts. The invention has for its object to provide an improved apparatus for assembling such devices which will expedite the work to the highest degree and reduce the cost to a minimum.

For a consideration of what I believe to be novel and my invention, attention is directed to the accompanying description and the claims appended thereto.

In the drawing, Fig. 1 is a plan view in outline of a system embodying my invention; Fig. 2 is a plan view on a larger scale of a part of the apparatus shown in Fig. 1; Fig. 3 is a sectional view taken on line 3—3, Fig. 2; Fig. 4 is a sectional view of trays used in connection with the system showing the manner in which they are supported on the assembling table and on each other; Fig. 5 is a side elevation of a clamping device, and Fig. 6 is a section taken on line 6—6, Fig. 5.

In carrying out my invention, I provide a long, comparatively narrow table upon which may be set trays and boxes holding parts to be used in assembling complete devices, and surrounding the table is a suitable track or runway on which a number of suitable carrying members are mounted, said carrying members preferably having some carrying means for clamping or holding the devices during the assembling operations. I also provide adjacent the table just referred to, and which may be termed the main table, one or more auxiliary tables on which parts may be assembled to form units for use on the main table providing the particular device being assembled requires the use of such auxiliary tables. By the term "unit" I mean the structure or completed part which results from assembling several elements and fastening them together to form a part to be assembled along with other parts or "units" and elements to form a completed device. For example, a device to be assembled might include a valve composed of a number of elements; the valve, however, when assembled being a "unit," complete in itself. Such a valve might be assembled at an auxiliary table and then transferred to the main table to be assembled into the device in question. The main table is divided into stations at which the operatives work, and the carrying members are moved progressively from one station to the next as the assembling of the particular devices thereon progresses.

For the purpose of illustrating my invention I have shown in the drawing a system laid out for assembling devices such as electric relays and I will now specifically describe this system as typical of my invention. This is only by way of example, however, and as will appear hereinafter one of the important features of my invention is its adaptability for use in assembling different devices; and also its adaptability for varying numbers of operatives.

Referring to the drawing, 10 indicates a table and 11 indicates a number of standards spaced suitable distances apart upon which table 10 is supported. In the present instance the table is shown as being U-shaped as this provides an arrangement which is very convenient in use and economical of floor space. Standards 11 are provided with vertically spaced arms 12 on which are supported track rails 13 and 14 which may be formed of suitable rods or pipes and which provide a continuous track around table 10. Supported on the track are a number of carriers 15 each comprising a plate 16 to the two ends of which are fastened roller frames 17 carrying rollers 18 and 19 which engage rod 13. Depending from plate 16 is a central leg 20 carrying a roller 21 which engages rod 14. As is obvious from an inspection of Fig. 3, carrier 15 may be readily removed from and replaced on the track. The center of gravity of the carrier is outside rod 13 so that the weight of the carrier holds roller 21 against rod 14 and the carrier in vertical position.

Carried by plate 16 of each carrier is a supporting member usually in the form of a clamp or holder for the device to be assembled. The specific structure of this supporting member, clamp or holder may vary in accordance with the type of device to be assembled. In general, however, it comprises a suitable clamp having jaws for engaging a baseplate or frame of the device to be assembled and such clamp where found desirable is made adjustable so it may be moved into different planes to facilitate the work of assembling. In the present instance the clamp or holder comprises an arm 23 formed integral with the plate 16 and provided with an opening 24 in its outer end. Located in opening 24 is one end of a member 25, the other end of which is provided with a head 26. (See Figs. 5 and 6.) In member 25 is a threaded, axially extending bore 27 into which screws a stud 28 having a hand wheel 29 on its outer end. Between the hub of the hand wheel and arm 23 is a collar 30 which is connected to member 25 by pins 31, the arrangement being such that while collar 30 can move axially relatively to member 25 it cannot move circumferentially relatively thereto. To this end pins 31 may have a drive fit with the holes in member 25 and a sliding fit with the holes in collar 30. The opening through collar 30 is not threaded and is of such size that stud 28 passes freely therethrough. Surrounding member 25 on the side of arm 23 opposite that on which collar 30 is located is a locking collar 32 having a narrow projecting flange 33 extending partly around it, the ends of the flange forming stops which engage a stop pin 34 projecting from arm 23. Extending transversely through member 25 and overlapping partly head 26 is a hole 35 through which extends a shaft 36 having on one end a clamp 37 comprising suitable jaws adapted to be moved toward and away from each other by means of a clamping screw 38 having a hand wheel 39 on its end. Shaft 36 has a sliding fit in hole 35 and to prevent its accidental removal it is provided with a groove 40 into which the end of a set screw 41 projects. Set screw 41 terminates short of the bottom of groove 40 so as not to interfere with the turning of shaft 36 in hole 35. Locking collar 32 has recesses on opposite sides which fit around shaft 36 and when hand wheel 29 is turned to screw stud 28 into bore 27, member 25 is drawn into opening 24 and shaft 36 is clamped between head 26 and locking collar 32. When hand wheel 29 is turned to release shaft 36, the shaft can be turned on its axis in hole 35 or it can be turned in a vertical plane from the full line position shown in Fig. 3 to the dotted line position, such movements being limited by stop pin 34 as is obvious. This arrangement permits the clamp 37 on the end of shaft 36 to be adjusted to desired positions to facilitate working on the assembling of the device clamped therein. Standards 11 are of such length that the table and carriers are at a height from the floor to hold the work in the most convenient position for the operative.

Referring now to Fig. 1, the main table 10 having the track around it is divided into stations, it being indicated as comprising seven stations in the present instance, although a fewer or greater number of stations may be provided as found desirable. Between the two legs of the U-shaped table 10 is an auxiliary table 45 here shown as comprising four stations numbered 8, 9, 10 and 11 and alongside the right hand leg of table 10 is a second auxiliary table 46 indicated as comprising five stations numbers 12, 13, 14, 15 and 16. On the tables at the various stations are trays 47 containing parts for the devices to be assembled, and also what may be termed "shop boxes" 48 likewise containing parts used in assembling the devices. Trays 47 may be of the general structure shown in Figs. 3 and 4, being so constructed that they may be readily stacked on top of each other and they may contain suitable partitions for facilitating the arranging of a certain number of parts therein and holding such parts in a position for convenient removal. Shop boxes 48 may be metal boxes with suitable labels on them stating what they contain, the number of parts, and at what station they belong. On the track surounding table 10 are a desired number of carriers 15, five being indicated at station 1, The parts for assembling any particular device are kept in a stock room and trays 47 and boxes 48 are filled therein and brought to the tables 10, 45, and 46 and placed thereon. The devices may be assembled most conveniently in lots of some even multiple of 25, such as, for example, lots of 250 or lots of 500 and the shop boxes 48 which are intended to contain such parts as screws, washers, etc., may have placed therein a sufficient number of parts for the entire lot. The trays 47 may have placed therein sufficient parts for 25 or 50 devices according to the nature of the device. The loading of the trays and boxes is done in the stock room and they are then brought to the tables and properly distributed thereon. The assembling is begun at station 1, a frame or base being put in the clamp of a carrier 15 and certain parts assembled thereon. Stations 8 and 9 are directly adjacent station 1 and at stations 8 and 9 certain parts may be assembled to form units which are used at station 1. For example, at station 8 certain parts may be riveted to the frame preparatory to its being clamped to a carrier 15 while at station 9 certain parts may be put together which form a unit to be assembled on the frame. The devices may be assembled very conveniently in groups of five and after five carriers 15 have received frames at stations 1 and certain parts assembled thereon, such carriers are then moved to station 2, station 1 then receiving five empty carriers from station 7. At station 2 further parts are assembled on the carriers after which the carriers are moved to station 3 where the assembling of the devices is completed sufficiently for testing. Stations 10 and 11 are directly adjacent station 2 and stations 14 and 15 are directly adjacent station 3 and at stations 10 and 11 and stations 14 and 15 units may be assembled for use at station 2 and station 3 respectively in the same manner as pointed out above in connection with stations 1, 8 and 9. Stations 12 and 13 may be used to assemble units used at stations 14 and 15 and station 16 may be used to assemble units used at any particular station desired. For example, it may be used to assemble covers for the completed devices such covers being then transferred to station 5 when they are put into place. After completion of the assembling at station 3 the carriers are moved to station 4 which is a test and calibration station. This station may comprise two spaces 50 and 51 suitably partitioned off. In space 50 high potential tests may be made using suitable apparatus as indicated at 50ª and in space 51 suitable calibrations and adjustments may be made by apparatus as indicated at 51ª. The carriers 15 are then moved to station 5 where calibration marks as determined at station 4 may be stamped, the devices adjusted and the covers or casings put into place thus completing the devices. The carriers are then moved to station 6 where a final inspection is made after which they are moved to station 7 where the completed devices are removed from the carriers, placed in suitable cartons, sealed, labeled and loaded on a truck to be conveyed to a store room. At station 7, 52 indicates suitable apparatus for making up cartons from flat stock, sealing and taping them, 53 indicates a truck for containing blanks to be made into cartons, and 54 indicates the truck for the completed packages. The empty carriers 15 from station 7 are then moved to station 1 to be used again.

As many groups of carriers 15 may be used and each group may comprise such a number as may be found desirable to carry forward continuously the assembling process in the most expeditious manner. And as the trays 47 and boxes 48 are emptied they are replaced by full ones, the trucks which bring the full trays and boxes from the stock room carrying the empty ones back to the stock room to be refilled. Assuming for example that the particular devices are being assembled in lots of 250 and that trays 47 hold parts for 50 devices, and the boxes 48 parts for 250 devices, then five trays will be required for each box and the stock room operators can load trucks accordingly.

There may be operatives at each of the stations or one operative may operate two or more stations according to the amount of work to be done. For example, stations 8 and 9 which may be utilized to feed units to station 1, may be operated by the operative at station 1, and likewise stations 10 and 11 may be operated by the operative at station 2, and stations 14 and 15 by the operative at station 3. In any event, however, certain specified work is done at each station and such special tools may be provided at the stations as are desirable to carry on the work. As will be clear from a consideration of Fig. 1, the arrangement of the tables and stations is such as to well adapt the system to varying numbers of operatives with the least disturbances to the continuous carrying on of the assembling work.

An apparatus embodying my invention and arranged particularly for assembling one type of device also adapts itself in a most advantageous manner to the assembling of other devices of the same general character, it being only necessary that the trays and boxes be loaded in the stock room with parts of the particular device wanted. Or, in a lot of any particular number of devices to be put through, some may be of one kind and others of another kind.

As will be clear, the main table 10 may take various forms and will vary in size according to the type of device to be assembled. And likewise the carrying members which are mounted on the track surrounding the main table may have different forms of supporting means as clamps, small platform, etc., according to the type of device to be assembled. In any event, however, the carrier being on a trackway surrounding the table and projecting outwardly from the table brings the work directly in front of the operative and in the handiest position to work on it. And with a clamping means on the carrier which is adjustable to different positions, the work can be readily turned as found desirable. There is, furthermore, no shifting of partly finished devices from one portion of a shop to another but all the work is done in a compact space as one continuous operation, the result being the complete device boxed ready for shipment.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States, is as follows:—

1. In combination, a work table adapted to support supplies of parts to be assembled, a track surrounding said table, and carriers on said track for holding devices while they are being assembled from the parts on the work table.

2. In combination, a work table adapted to support supplies of parts to be assembled, a track surrounding said table, carriers on said track, and clamping members on said carriers for clamping devices during assembly from the parts on the work table.

3. In combination, a work table adapted to support supplies of parts to be assembled, standards supporting said table, a track carried by said standards said track extending continuously around the table, and carriers on said track for holding devices while they are being assembled from the parts on the work table.

4. In combination, a work table divided into stations and adapted to support parts to be assembled, a continuous track surrounding said table at the edge thereof, and carriers on said track adapted to be moved from station to station, said carriers comprising means for holding devices while they are being assembled from the parts on the work table.

5. In combination, a work table divided into stations and adapted to support parts to be assembled, a continuous track surrounding said table at the edge thereof, and carriers on said track adapted to be moved from station to station, said carriers comprising adjustable clamping means for holding devices while they are being assembled from the parts on the work table.

6. In combination, a work table, standards supporting said table, a track carried by said standards, said track extending continuously around the table, and carriers on said track for holding devices while they are being assembled from parts supported on the work table, said carriers projecting outwardly from said track and being at such height from the floor as to be within convenient reach of an operative.

7. In combination, a table adapted to support parts to be assembled, standards supporting said table, vertically spaced rails carried by said standards and forming a track surrounding the table, carriers having supporting rollers which run on said track, and means on said carriers for holding a device while being assembled.

8. In combination, a main work table divided into stations and adapted to support trays containing parts to be assembled, a continuous track surrounding said main table, carriers on said track adapted to be moved from station to station, said carriers supporting devices while being assembled, and an auxiliary work table adjacent said main table, said auxiliary table being divided into stations at which units may be assembled for use at stations at the main table.

9. In combination, a U-shaped work table divided into stations and adapted to support trays containing parts to be assembled, a continuous track surrounding said main table, carriers on said track adapted to be moved from station to station, said carriers being adapted to support devices while being assembled from parts contained in trays supported on the U-shaped work table, and an auxiliary table located between the two side portions of said U-shaped table, said auxiliary table being divided into stations at which parts may be assembled for use at adjacent stations of the main table.

In witness whereof, I have hereunto set my hand this 30th day of April, 1919.

JOHN W. UPP.